(12) United States Patent
Kondro et al.

(10) Patent No.: US 11,793,109 B2
(45) Date of Patent: Oct. 24, 2023

(54) LAWNMOWERS WITH SAFETY FEATURES AND METHODS ASSOCIATED THEREWITH

(71) Applicant: TECHTRONIC CORDLESS GP, Anderson, SC (US)

(72) Inventors: Grzegorz Kondro, Piedmont, SC (US); Shuai Shao, Simpsonville, SC (US); Robert T. Givens, Anderson, SC (US); Ayesha Iftiqhar, Greenville, SC (US); Jonathan R. Feldkamp, Anderson, SC (US)

(73) Assignee: TECHTRONIC CORDLESS GP, Anderson, SC (US)

( * ) Notice: Subject to any disclaimer, the term of this patent is extended or adjusted under 35 U.S.C. 154(b) by 403 days.

(21) Appl. No.: 17/153,249

(22) Filed: Jan. 20, 2021

(65) Prior Publication Data

US 2021/0251136 A1     Aug. 19, 2021

Related U.S. Application Data

(60) Provisional application No. 62/976,070, filed on Feb. 13, 2020.

(51) Int. Cl.
*A01D 34/68* (2006.01)
*A01D 34/82* (2006.01)
(Continued)

(52) U.S. Cl.
CPC ....... *A01D 34/008* (2013.01); *A01D 34/6806* (2013.01); *A01D 34/6818* (2013.01);
(Continued)

(58) Field of Classification Search
CPC .............. A01D 34/008; A01D 34/6806; A01D 34/6818; A01D 34/828; A01D 43/0631; A01D 2101/00
(Continued)

(56) References Cited

U.S. PATENT DOCUMENTS 6,360,605 B1    3/2002   Pinter
7,259,436 B2    8/2007   Offenberg
(Continued)

FOREIGN PATENT DOCUMENTS

CN    201199324 Y    2/2009
CN    101027961 B    7/2012
(Continued)

OTHER PUBLICATIONS

Canadian Office Action Corresponding with Application No. 3107817 dated May 31, 2022 (1 page).
(Continued)

*Primary Examiner* — Mahmoud Gimie
(74) *Attorney, Agent, or Firm* — Dority & Manning, P.A.

(57) ABSTRACT

A lawnmower comprising: a body; a cutting element coupled with the body; a motor configured to drive the cutting element; a sensor comprising an accelerometer configured to detect an angular displacement of the lawnmower with respect to a vertical axis and a wobble of the cutting element with respect to a horizontal plane; and a processor configured to: compare the detected angular displacement against a tilt threshold value; compare the detected wobble against a wobble threshold value; and control an operational speed of the cutting element when the angular displacement exceeds the tilt threshold value or when the wobble exceeds the wobble threshold value.

20 Claims, 4 Drawing Sheets

(51) Int. Cl.
*A01D 43/063* (2006.01)
*A01D 34/00* (2006.01)
*A01D 101/00* (2006.01)

(52) U.S. Cl.
CPC ....... *A01D 34/828* (2013.01); *A01D 43/0631* (2013.01); *A01D 2101/00* (2013.01)

(58) Field of Classification Search
USPC ......................................................... 56/10.2
See application file for complete search history.

(56) References Cited

U.S. PATENT DOCUMENTS

| | | | |
|---|---|---|---|
| 7,870,709 | B2 | 1/2011 | Digman |
| 8,165,759 | B2 | 4/2012 | Boylston |
| 8,196,936 | B2 | 6/2012 | Cheek |
| 8,352,116 | B2 | 1/2013 | Boylston |
| 8,548,722 | B2 | 10/2013 | Puhalla |
| 9,459,097 | B2 | 10/2016 | Davey |
| 9,493,339 | B2 | 11/2016 | Ikehashi |
| 9,618,338 | B2 | 4/2017 | Fehr |
| 10,356,977 | B2 | 7/2019 | Kulkarni |
| 10,390,483 | B2 | 8/2019 | Balutis |
| 10,485,163 | B2 | 11/2019 | Dombrowski |
| 2009/0237227 | A1* | 9/2009 | Ehrhart ............... B60Q 9/00 340/441 |
| 2010/0191408 | A1 | 7/2010 | Boylston |
| 2012/0159916 | A1 | 6/2012 | Ishii |
| 2016/0014954 | A1 | 1/2016 | Dwyer |
| 2018/0160618 | A1 | 6/2018 | Kawamoto |
| 2018/0263181 | A1 | 9/2018 | Willgert et al. |
| 2019/0077395 | A1 | 3/2019 | Ross |
| 2019/0269067 | A1 | 9/2019 | Fukano |
| 2019/0269068 | A1 | 9/2019 | Fukano |

FOREIGN PATENT DOCUMENTS

| | | |
|---|---|---|
| CN | 202931816 U | 5/2013 |
| CN | 204440165 U | 7/2015 |
| CN | 204888032 U | 12/2015 |
| CN | 209030178 U | 6/2019 |
| EP | 2966968 A1 | 1/2016 |
| EP | 3236735 A1 | 11/2017 |
| EP | 3567999 A1 | 11/2019 |
| EP | 3545749 A4 | 12/2019 |
| EP | 3437454 B1 | 1/2020 |
| JP | 2019035376 A * | 3/2019 |
| WO | WO2013064301 A1 | 5/2013 |
| WO | WO2018097033 A1 | 5/2018 |
| WO | WO2018161830 A1 | 9/2018 |
| WO | WO2019180951 A1 | 9/2019 |

OTHER PUBLICATIONS

EP Search Report for EP Patent Application No. EP21152946 dated Jun. 30, 2021; 2 pages.

* cited by examiner

LAWNMOWERS WITH SAFETY FEATURES AND METHODS ASSOCIATED THEREWITH

This application claims the benefit of priority to U.S. Provisional Patent Application No. 62/976,070, filed on Feb. 13, 2020, the disclosure of which is incorporated by reference herein in its entirety.

FIELD

The present disclosure relates to lawnmowers, and more particularly to lawnmowers with processors configured to increase operational safety.

BACKGROUND

Lawnmowers come in various designs, including push mowers, riding mowers, autonomous mowers, and combinations thereof. In general, lawnmowers include one or more cutting elements including, for example, one or more sharpened edge(s), that trim underlying lawn to a desired height. Typically, cutting elements are rotated at high speeds to create clean cuts.

It is not uncommon for lawnmowers to tip over during use, particularly when operated incorrectly or on steep surfaces. In such instances, the spinning cutting elements can pose immediate danger to the operator.

Accordingly, a lawnmower having increased operational safety is desired.

BRIEF DESCRIPTION

Aspects and advantages of the invention will be set forth in part in the following description, or may be obvious from the description, or may be learned through practice of the invention.

In accordance with one aspect, the present disclosure is directed to a lawnmower including a body, a cutting element coupled with the body, a motor configured to drive the cutting element, a sensor comprising an accelerometer configured to detect an angular displacement of the lawnmower with respect to a vertical axis and a wobble of the cutting element with respect to a horizontal plane, and a processor. The processor is configured to compare the detected angular displacement against a tilt threshold value, compare the detected wobble against a wobble threshold value, and control an operational speed of the cutting element when the angular displacement exceeds the tilt threshold value or when the wobble exceeds the wobble threshold value.

In accordance with another aspect, the present disclosure is directed to a lawnmower including a sensor comprising an accelerometer configured to detect an angular displacement of the lawnmower with respect to a vertical axis and a wobble of at least a portion of the lawnmower as measured with respect to a horizontal plane; and a processor configured to: compare the detected angular displacement against a tilt threshold value; compare the detected wobble against a wobble threshold value; and adjust an operational aspect of the lawnmower when the angular displacement exceeds the tilt threshold value or when the wobble exceeds the wobble threshold value.

In accordance with yet another aspect, the present disclosure is directed to a method of operating a lawnmower. The method includes moving the lawnmower across a surface with a cutting element of the lawnmower rotating. The method further includes, with a MEM sensor, detecting an angular displacement of the lawnmower with respect to a vertical axis and a wobble of the cutting element with respect to a horizontal plane. The method further includes processing the detected angular displacement and wobble by comparing the detected angular displacement against a tilt threshold value; comparing the detected wobble against a wobble threshold value; and controlling an operational speed of the cutting element when the angular displacement exceeds the tilt threshold value or when the wobble exceeds the wobble threshold value.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Figure 1:
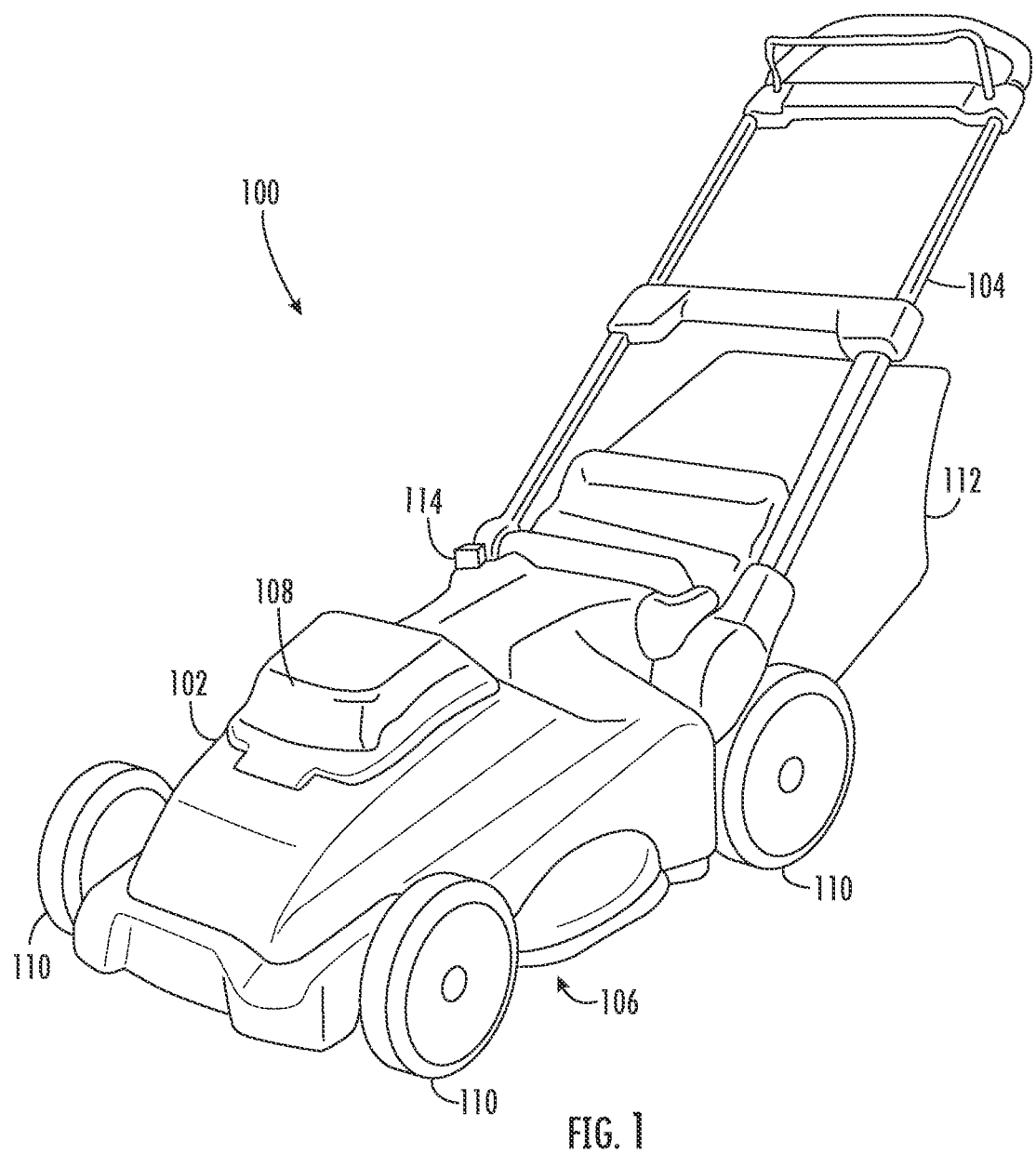
FIG. 1 includes a perspective view of a lawnmower in accordance with an embodiment of the present disclosure.

Reference now will be made in detail to embodiments of the invention, one or more examples of which are illustrated in the drawings. Repeat use of reference characters in the present specification and drawings is intended to represent the same or analogous features or elements of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and do not necessarily signify sequence or importance of the individual components. As used herein, terms of approximation, such as "generally," or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Referring now to the Figures, the present disclosure is generally directed to a lawnmower with safety enabling features. FIG. 1 illustrates a perspective view of an exemplary lawnmower 100 (referred interchangeably hereinafter as "the mower") in accordance with an embodiment described herein. The mower 100 includes a body 102 coupled with a handle 104. The body 102 can define a cutting area 106 including one or more cutting elements 118 (FIG. 3) configured to cut grass or other ground cover. The cutting elements 118 can include, for example, fixed blades, rotatable blades and/or cording.

The body 102 can house a motor 120 (FIG. 2) configured to drive the cutting elements 118. In an embodiment, the motor 120 can be powered by an engine, such as a gasoline engine. In another embodiment, the motor 120 can be powered by a battery 108 or through an external electrical outlet.

In the illustrated embodiment, the mower 100 is a push mower. The mower 100 is operated by a user that stands behind the handle 104 and pushes the mower 100 across an underlying surface. In another embodiment, the mower 100 can include a push assist mower, including, for example, one or more powered wheels 110 which assist in moving the mower 100 across the underlying surface. The one or more powered wheels 110 may be powered by the same motor 120 as previously described and/or by one or more separate motor(s). In other embodiments, the mower 100 can include a riding mower or partially-riding mower. In yet other embodiments, the mower 100 can include an autonomous, or semi-autonomous, mower, i.e., a mower configured to operate without requiring active input from an operator.

The mower 100 can include a clipping bag 112 configured to receive clippings ejected from the cutting area 106. The bag 112 may be removable from the body 102 to permit an operator to empty clippings when the bag 112 becomes full. A sensor 114 may detect the presence of the bag 112. When the bag 112 is removed from the mower 100, the sensor 114 can generate a signal notifying a processing element, e.g., the processor described hereinafter, of the removed bag 112.

Figure 2:
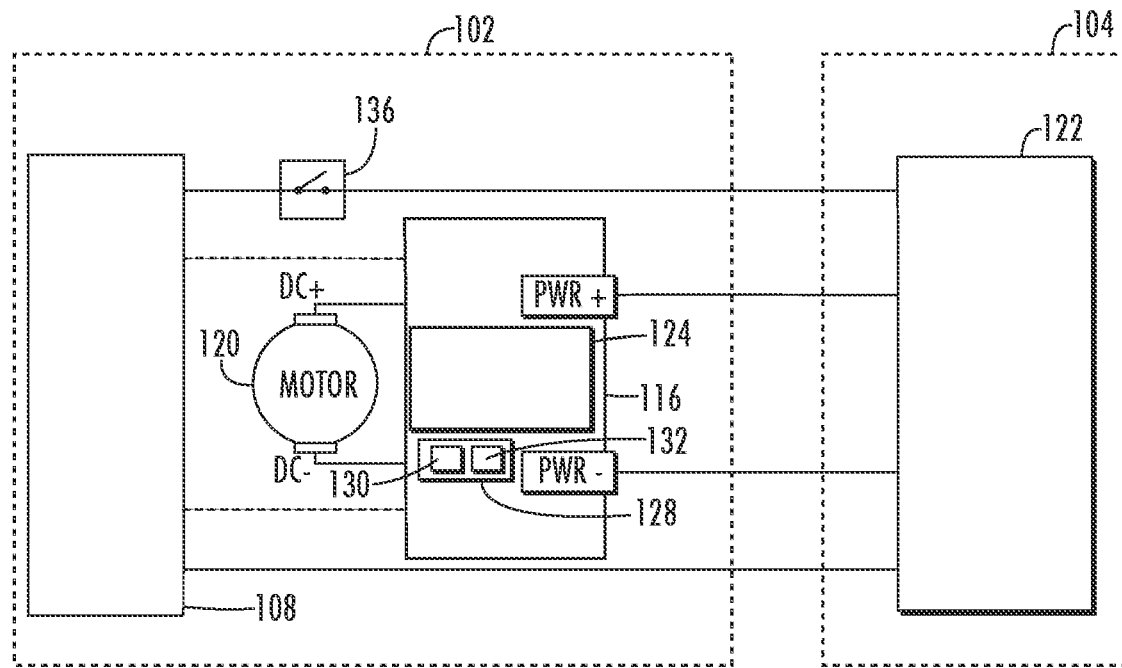
FIG. 2 includes a schematic view of a logic device of a lawnmower in accordance with an embodiment of the present disclosure.

Referring to FIG. 2, the mower 100 can further include a logic device 116 having one or more electronic components and/or processors. The logic device 116 may be a printed circuit board assembly (PCBA) including various components like resistors, integrated circuits, capacitors, transformers, and the like. The logic device 116 can be electrically connected to the motor 120 and a motor controller switch 122. The motor controller switch 122 may be positioned along the handle 104 of the mower 100 to allow an operator to selectively control operation of at least one aspect of the mower 100, such as operation of the cutting element 118. In an embodiment, the logic device 116 can be disposed in series with the motor 120 and the motor controller switch 122. In operation, the logic device 116 can control an operational aspect of the mower 100 in response to user input at the motor controller switch 122.

The logic device 116 can include a tilt detection sensor 124 configured to detect operational aspects of the mower 100. For example, the tilt detection sensor 124 can monitor an angular displacement of the mower 100 with respect to a vertical axis thereof. The vertical axis may correspond with the axis of gravitational acceleration. The tilt detection sensor 124 may further detect wobble of the cutting element 118 with respect to a horizontal (e.g., an X-Y) plane, as described in greater detail hereinafter.

The tilt detection sensor 124 can be part of the PCBA previously described, e.g., soldered thereto, or part of a stand-alone element in electronic communication with one or more processors of the logic device 116. In an embodiment, the tilt detection sensor 124 includes a micro-electromechanical (MEM) sensor. The MEM sensor can include one or more integrated circuits, accelerometers, capacitors, resistors, and the like. In another embodiment, the tilt detection sensor 124 can include a piezoresistive and/or piezoelectric accelerometer. In an embodiment, the MEM sensor can have an areal size less than 1 $cm^2$, such as less than 0.75 $cm^2$, such as less than 0.5 $cm^2$, such as less than 0.25 $cm^2$, such as less than 0.1 $cm^2$.

Figure 3:
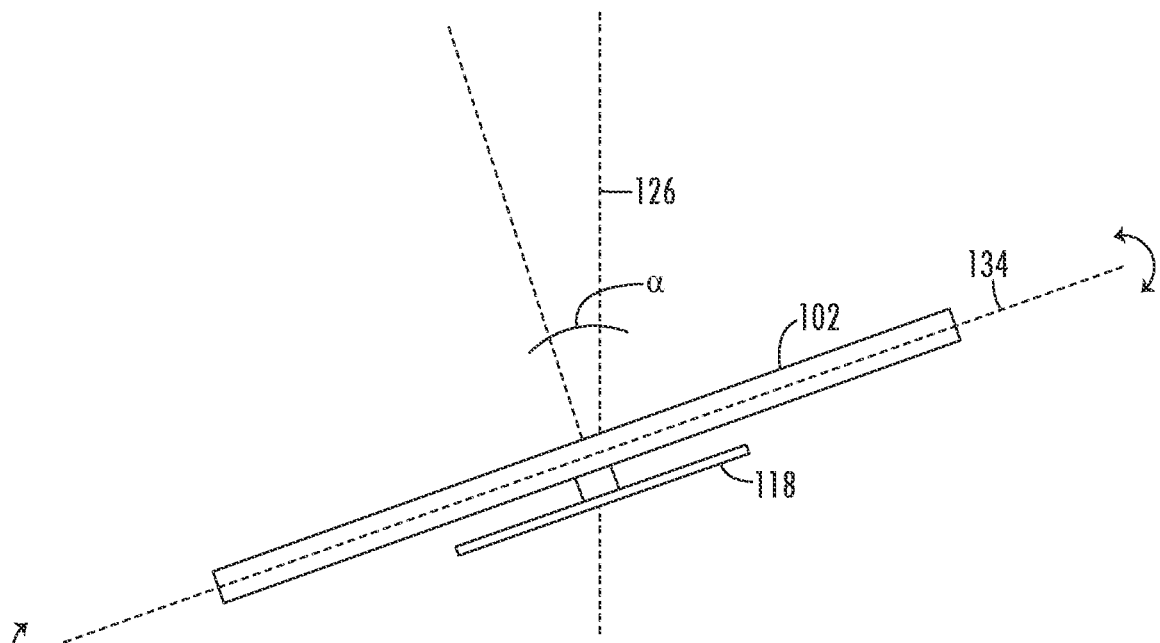
FIG. 3 includes a schematic view of a lawnmower in accordance with an embodiment of the present disclosure.

Referring to FIG. 3, the tilt detection sensor 124 can be configured to detect angular displacement, $\alpha$, of the mower 100 or a part thereof, e.g., the body 102, with respect to a vertical axis 126. For example, as the mower 100 is moved along a surface, the varying angular inclination of the surface may cause the mower 100 to tilt. As the mower 100 tilts, the tilt detection sensor 124 can detect the angular displacement of the mower 100 relative to the vertical axis 126.

In an embodiment, the tilt detection sensor 124 may detect angular displacement as a result of the sensed force applied by gravitational pull. When the mower 100 is perfectly horizontal, such that the angular displacement, $\alpha$, of the mower 100 is 0°, the tilt detection sensor 124 may detect a gravitational acceleration of approximately 9.8 $m/s^2$. More particularly, when horizontal, the detected gravitational acceleration may normally range between approximately 9.76 $m/s^2$ and 9.83 $m/s^2$ depending on geographical position. As the mower 100 begins to tilt, the gravitational acceleration detected by the tilt detection sensor 124 can decrease. For instance, when the mower 100 is tilted by an angular displacement of approximately 45°, as measured with respect to the vertical axis 126, the detected gravitational acceleration may be approximately 6.93 $m/s^2$, e.g., about 0.707 times ($1/\sqrt{2}$) the gravitation acceleration when the mower 100 is in the upright orientation.

Referring again to FIG. 2, the logic device 116 can further include a processor 128 configured to analyze the detected angular displacement of the mower 100. The processor 128 may be part of the PCBA previously described, e.g., soldered thereto, or part of a stand-alone element in electronic communication with the tilt detection sensor 124. The processor 128 can include one or more processing elements including one or more logic elements 130 and memory storage devices 132. The memory storage device 132 can be programmable to receive a tilt threshold value indicative of a maximum prescribed operational, angular displacement of the mower 100 under safe operational capacity. The tilt threshold value may indicate a preferred angular displacement at which amount any additional angular displacement may be deemed dangerous. For example, in an embodiment, the tilt threshold value may be approximately 45°, as measured with respect to the vertical axis 126. In a more particular embodiment, the tilt threshold value may include an error margin, e.g., an angular margin of ±15° the tilt threshold value. The inclusion of an error margin may be particularly suitable for low resolution tilt detection sensors 124 and to permit manufacturing variance and tolerance with respect to the mounting position and angle of the tilt detection sensor 124 at the factory.

The processor 128 can determine the angular displacement of the mower 100 based on the force sensed by the tilt detection sensor 124. For instance, the processor 128 may utilize trigonometric functions to determine the angular displacement of the mower 100 in response to the sensed force of the tilt detection sensor 124.

The processor 128 can be configured to compare the angular displacement detected by the tilt detection sensor 124 against the tilt threshold value. When the detected angular displacement exceeds the tilt threshold value, the processor 128 can generate a signal to control an operational aspect of the mower 100, e.g., an operational speed of the cutting element 118. In a particular embodiment, the processor 128 can reduce the speed of the cutting element 118 when the tilt threshold value is exceeded. In a more particular embodiment, the processor 128 can terminate rotation of the cutting element 118 when the detected angular displacement exceeds the tilt threshold value.

In an embodiment, the processor 128 is configured to wait a duration of time after the detected angular displacement exceeds the tilt threshold value before causing adjustment of an operational aspect of the mower 100, e.g., terminating rotation of the cutting element 118. The duration of time may be programmed into and stored in the memory storage device 132 and may include a duration of at least 1 second, such as at least 2 seconds, at least 3 seconds, at least 4 seconds, or at least 5 seconds. Delaying adjustment of the operational aspect, e.g., terminating rotation of the cutting element 118, may prevent undesirable mower 100 shut down for momentary angular displacements not typically associated with the mower tipping over. For instance, the mower 100 may be tilted backward at the handle by the operator when quickly changing direction of the mower. That is, when suddenly changing directions of the mower, it is not uncommon for operators to push down on the handle, causing the mower to pivot on the back wheels and allowing it to more easily change directions. In such instances, it is less than desirable for the mower 100 to shut down as a result of the angular displacement exceeding the tilt threshold value. Accordingly, the duration of the delay may be selected to mitigate undesirable shut down. In certain instances, the processor 128 may be configurable to learn operational aspects, e.g., the pivoting angle used by an operator to change position, and update values, e.g., the delay time, accordingly to prevent undesirable shut down.

In an embodiment, the processor 128 may be configured to filter noise from the detected angular displacement, a. The noise may be associated with wobble in the horizontal plane. The wobble may be caused by one or more unbalanced blades of the cutting element 118, motor wobble, or the like. Specifically, wobble can be generated by eccentric, unbalanced rotation of the cutting element 118. The wobble of the cutting element 118 can be detected by the tilt detection sensor 124 in the form of an oscillation of angular displacement, $\alpha$, of the mower 100 relative to the vertical axis 126.

Figure 4:
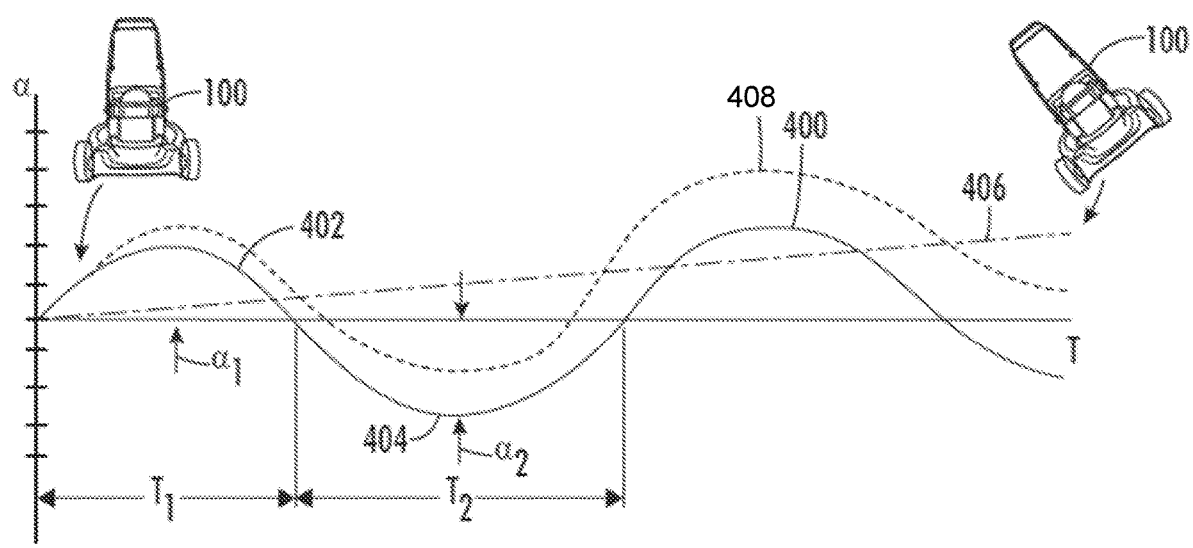
FIG. 4 includes waves representative of angular displacement and wobble as detected by a logic device of a lawnmower in accordance with an embodiment of the present disclosure.

Referring to FIG. 4, the tilt detection sensor can detect absolute angular displacement of the mower 100, as illustrated by line 404. Absolute angular displacement can include both tilt and wobble. The processor 128 can utilize algorithmic determination to filter out the oscillation caused by the wobble. The filtered oscillation is generally illustrated by sinusoidal wave 400 which is caused by rotational momentum and wobble of the cutting element 118 cycling about a 360° axis at approximately even time intervals.

The generally sinusoidal wave 400 can define peaks 402 and troughs 404 with respect to the vertical axis 126. The peaks 402 may generally correlate to angular displacement in a first direction and the troughs 404 may generally correlate to angular displacement in a second direction opposite the first direction. The peaks 402 may define first amplitudes, $\alpha_1$, and the troughs 404 may define second amplitudes, $\alpha_2$. In an embodiment, the first and second amplitudes may be approximately equal to one another. The generally sinusoidal wave 400 can further define time intervals between balanced, i.e., non-angularly displaced, orientations. A first time interval, $T_1$, may be defined when the generally sinusoidal wave 400 is in a peak phase and a second time interval, $T_2$, may be defined when the generally sinusoidal wave 400 is in a trough phase. In an embodiment, the first and second time intervals may be approximately equal to one another.

The processor 128 may be configured to filter noise associated with the wobble (e.g., the manifestation of the generally sinusoidal wave 400) from the detected angular displacement for purpose of determining the angular displacement, $\alpha$, of the mower 100 and to isolate the wobble for determining wobble of the cutting element 118. For example, the processor 128 may include logic configured to detect or infer the sinusoidal wave 400 and mitigate inclusion of the resulting wobble from angular displacement calculations.

Subtracting the sinusoidal wave 400 from the detected absolute angular displacement of the mower 100 illustrated by line 408 is a simplified way to determine the actual angular displacement of the mower 100 independent of wobble. The actual angular displacement is illustrated by line 406. In the illustrated exemplary embodiment, it is clear that the angular displacement of the mower 100 is increasing over time, independent of wobble. In an embodiment, the processor 128 can utilize the actual angular displacement of the mower 100 when comparing against the tilt threshold value.

In an embodiment, the processor 128 may be configured to further monitor the wobble detected in the angular displacement, e.g., the generally sinusoidal wave 400, and generate a signal when the amplitude of the generally sinusoidal wave 400 exceeds a prescribed safe level. This may occur for example, if damage occurs to one or more blades of the cutting element 118, if something becomes lodged within the cutting element 118, or if the cutting element 118 becomes deformed, resulting in an eccentric, angular loading condition. The resulting wobble detected by the tilt detection sensor 124 may terminate rotation of the cutting element 118 to prevent damage to the mower 100 or injury to the operator.

In an embodiment, the tilt detection sensor 124 is configured to detect wobble of the cutting element 118 with respect to a horizontal plane represented by line 134 in FIG. 3. As previously described with respect to FIG. 4, the wobble can manifest as a generally sinusoidal wave 400. The resulting wobble can be compared by the processor 128 against a wobble threshold value. The wobble threshold value can correspond with a predetermined wobble safety threshold. When the wobble exceeds the wobble threshold value, the processor 128 can generate a signal to control an operational aspect of the mower 100, e.g., an operational speed of the cutting element 118. In a particular embodiment, the processor 128 can reduce the speed of the cutting element 118 when the wobble threshold value is exceeded. In a more particular embodiment, the processor 128 can terminate rotation of the cutting element 118 when the wobble exceeds the wobble threshold value.

The wobble threshold value may be different than the tilt threshold value. For example, the amplitude of allowable wobble may be less than the amplitude set for the tilt threshold value.

In an embodiment, similar to tilt threshold, the processor 128 is configured to wait a duration of time after the wobble exceeds the wobble threshold value before causing adjustment of an operational aspect of the mower 100, e.g., terminating rotation of the cutting element 118. The duration of time may be programmed into and stored in the memory storage device 132 and may include a duration of at least 1 second, such as at least 2 seconds, at least 3 seconds, at least 4 seconds, or at least 5 seconds.

In an embodiment, the processor 128 may be configured to prevent the mower 100 from starting when the sensor 124 detects and angular displacement greater than a preset value, e.g., the tilt threshold value or another determined value (e.g., a start-up tilt threshold value different from the tilt threshold value). In this regard, the mower 100 may be stored in a vertical orientation without risk of accidentally rotating the cutting element 118. The processor 128 may be configured to delay start up of the cutting element 118 until the mower 100 is horizontal for a duration of time, e.g., at least 1 second, at least 2 seconds, at least 3 seconds, at least 4 seconds, or at least 5 seconds. The delay can be programmed and stored in the memory storage device 132.

As previously described, the mower 100 may include a sensor 114 configured to detect removal of the bag 112. In an embodiment, the sensor 114 can communicate the status of the bag 112 with the processor 128 which can shut off operation of the cutting element 118 when the bag is detected as being removed.

In an embodiment, the mower 100 may further include a temperature sensor configured to monitor the temperature of at least one component of the mower 100, e.g., the PCBA. The temperature sensor can be configured to detect the temperature of the at least one component and send a signal to the logic device 116 indicating the detected temperature. In an embodiment, the processor 128 can use the information from the temperature sensor to affect operations of the mower 100. For example, the processor 128 can shut down the mower 100 or change an operational state thereof when the detected temperature exceeds a temperature threshold. The temperature threshold can be stored in the memory storage device 132.

In an embodiment, the mower 100 can further include a safety switch, such as, e.g., safety shut-off switch 136, configured to provide a safety function, such as shutting down the mower 100 if a condition is sensed by the sensor 124 that the processor 128 determines exceeds the tilt threshold value. By way of example, the safety shut-off switch 136 can be disposed in electrical communication with the battery and motor controller switch 122.

Figure 5:
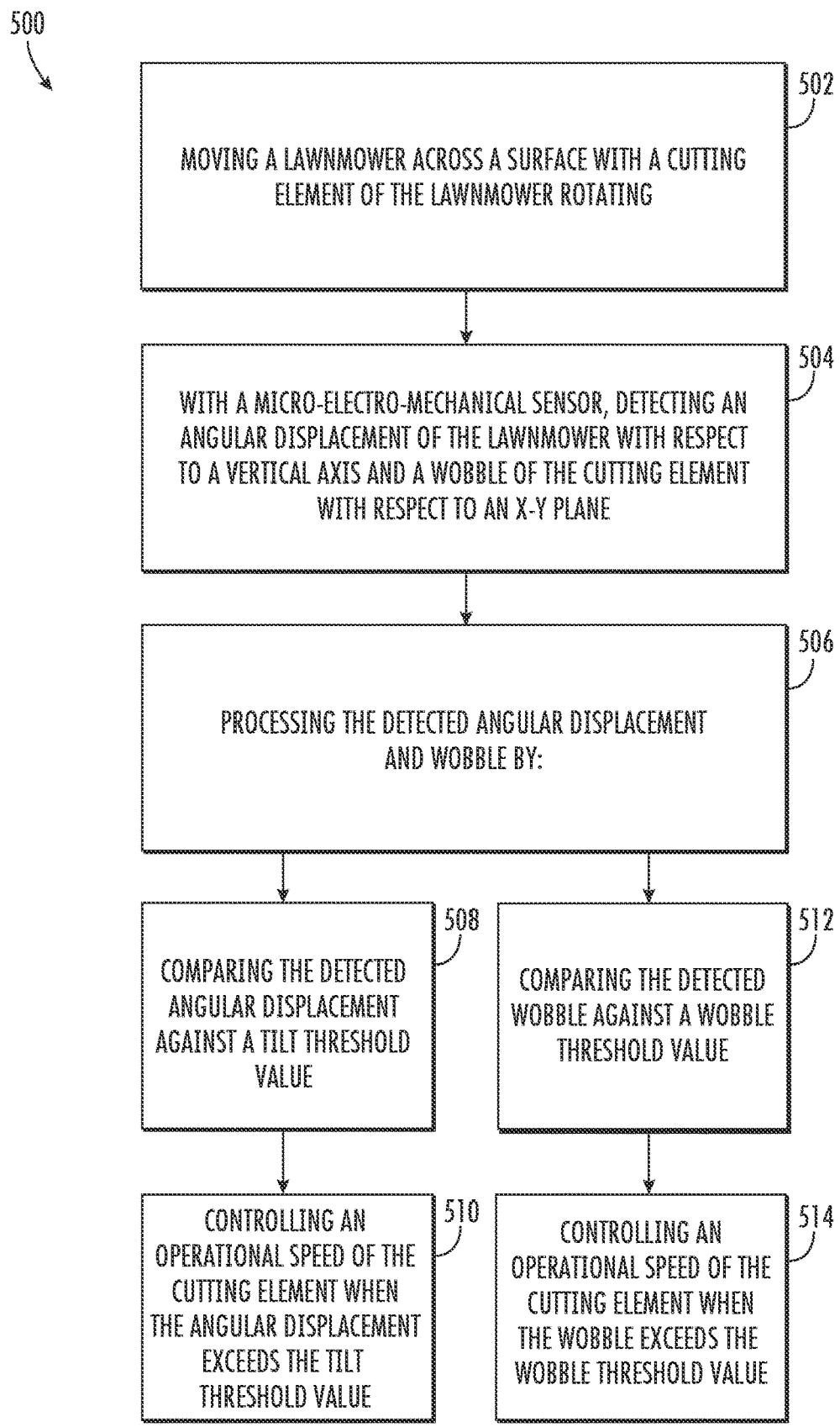
FIG. 5 includes a method of using a lawnmower in accordance with an embodiment of the present disclosure.

FIG. 5 illustrates a method 500 of using a mower. The method 500 includes a step 502 of moving a lawnmower across a surface with a cutting element of the lawnmower rotating. In an embodiment, the step 502 can be performed by pushing the lawnmower. In other embodiments, the step 502 can be performed with an at least partially motorized wheel of the lawnmower. The method 500 further includes a step 504 of, with a micro-electro-mechanical sensor, detecting an angular displacement of the lawnmower with respect to a vertical axis and a wobble of the cutting element with respect to a horizontal plane. The method 500 further includes a step 506 of processing the detected angular displacement and wobble.

The method 500 can further include a step 508 of comparing the detected angular displacement from step 506 against a tilt threshold value. The processor can then control an operational speed of the cutting element when the angular displacement exceeds the tilt threshold value in step 510. The method can also include a step 512 of comparing the detected wobble against a wobble threshold value. The processor can then control an operational speed of the cutting element when the wobble exceeds the wobble threshold value in step 514.

Lawnmowers in accordance with one or more embodiments described herein may exhibit increased operational safety. That is, the lawnmowers may be configured to either ramp down or stop rotation of the cutting element when the lawnmower is detected as having tilted, whereby the cutting element is exposed and may potentially cause harm to the operator or other people nearby.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A lawnmower comprising:
   a body;
   a cutting element coupled with the body;
   a motor configured to drive the cutting element;
   a sensor comprising an accelerometer configured to detect an angular displacement of the lawnmower with respect to a vertical axis and a wobble of the cutting element with respect to a horizontal plane; and
   a processor configured to:
      compare the detected angular displacement against a tilt threshold value;
      compare the detected wobble against a wobble threshold value; and
      control an operational speed of the cutting element when the angular displacement exceeds the tilt threshold value or when the wobble exceeds the wobble threshold value.

2. The lawnmower of claim 1, wherein the processor is further configured to terminate rotation of the cutting element when the angular displacement exceeds the tilt threshold value or the wobble exceeds the wobble threshold value.

3. The lawnmower of claim 2, wherein, before terminating rotation of the cutting element, the processor is configured to wait for a duration of time after the detected angular displacement exceeds the tilt threshold value.

4. The lawnmower of claim 3, wherein the detected angular displacement must remain above the tilt threshold value for the entire duration for the processor to terminate rotation of the cutting element, and wherein the duration is at least 2 seconds.

5. The lawnmower of claim 1, wherein the tilt threshold value is 45°±15°, as measured with respect to the vertical axis.

6. The lawnmower of claim 1, wherein the sensor comprises a micro-electro-mechanical (MEM) sensor disposed on a deck of the body of the lawnmower.

7. The lawnmower of claim 1, wherein the processor is further configured to filter noise from the detected angular displacement, the noise being associated with the wobble.

8. The lawnmower of claim 1, wherein the processor is further configured to prevent start-up rotation of the cutting element when the lawnmower is off and the tilt threshold value is exceeded.

9. The lawnmower of claim 1, wherein the processor is further configured to control the operational speed of the cutting element when a bag sensor detects that a clipping bag of the lawnmower is removed.

10. The lawnmower of claim 1, wherein the processor is further configured to control the operational speed of the cutting element when a temperature sensor monitoring a temperature of at least one component of the lawnmower exceeds a temperature threshold.

11. The lawnmower of claim 1, wherein the processor is disposed in series between the motor and a motor controller switch configured to be activated by an operator.

12. A lawnmower comprising:
a sensor comprising an accelerometer configured to detect an angular displacement of the lawnmower with respect to a vertical axis and a wobble of at least a portion of the lawnmower as measured with respect to a horizontal plane; and
a processor configured to:
compare the detected angular displacement against a tilt threshold value;
compare the detected wobble against a wobble threshold value; and
adjust an operational aspect of the lawnmower when the angular displacement exceeds the tilt threshold value or when the wobble exceeds the wobble threshold value.

13. The lawnmower of claim 12, wherein the processor is configured to adjust the operational aspect of the lawnmower after the detected threshold value is exceeded for a duration of at least 2 seconds.

14. The lawnmower of claim 12, wherein the tilt threshold value is 45°±15°, as measured with respect to the vertical axis.

15. The lawnmower of claim 12, wherein the processor is further configured to remove noise from the sensed angular displacement, the noise being associated with the wobble.

16. The lawnmower of claim 12, wherein the processor is further configured to prevent start-up the lawnmower when the lawnmower is off and the tilt threshold value is exceeded.

17. A method of operating a lawnmower, the method comprising:
moving the lawnmower across a surface with a cutting element of the lawnmower rotating;
with a micro-electro-mechanical (MEM) sensor, detecting an angular displacement of the lawnmower with respect to a vertical axis and a wobble of the cutting element with respect to a horizontal plane;
processing the detected angular displacement and wobble by:
comparing the detected angular displacement against a tilt threshold value;
comparing the detected wobble against a wobble threshold value; and
controlling an operational speed of the cutting element when the angular displacement exceeds the tilt threshold value or when the wobble exceeds the wobble threshold value.

18. The method of claim 17, wherein controlling the operational speed of the cutting element comprises terminating rotation of the cutting element when the angular displacement exceeds the tilt threshold value or the wobble exceeds the wobble threshold value for a duration of time after the detected angular displacement exceeds the tilt threshold value or the detected wobble exceeds the wobble threshold.

19. The method of claim 17, further comprising filtering noise from the detected angular displacement, the noise being associated with the wobble.

20. The method of claim 17, further comprising:
controlling operational speed of the cutting element when a bag sensor detects that a clipping bag of the lawnmower is removed; and
controlling operational speed of the cutting element when a temperature sensor monitoring a temperature of at least one component of the lawnmower exceeds a temperature threshold.

* * * * *